(No Model.)

T. E. DAVIES.
HARROW OR CULTIVATOR TOOTH.

No. 350,724. Patented Oct. 12, 1886.

Witnesses:
W. M. Bjorkman
H. R. Williams

Inventor:
Thomas E. Davies,
by Simonds & Burdett,
Attys.

UNITED STATES PATENT OFFICE.

THOMAS E. DAVIES, OF HARTFORD, CONNECTICUT.

HARROW OR CULTIVATOR TOOTH.

SPECIFICATION forming part of Letters Patent No. 350,724, dated October 12, 1886.

Application filed May 19, 1886. Serial No. 202,621. (No model.)

*To all whom it may concern:*

Be it known that I, THOMAS E. DAVIES, of Hartford, in the county of Hartford and State of Connecticut, have invented certain new and useful Improvements in Harrow or Cultivator Teeth, of which the following is a full, clear, and exact description, whereby any one skilled in the art can make and use the same.

The object of my improvement is to provide a tooth for use on a harrow or cultivator that shall be particularly efficient in cutting and breaking up sward and clods of earth, while permitting greater freedom of movement of the harrow than is possible with prior farm implements of this class.

My improvement consists in the combination of a harrow or cultivator frame having tooth-sockets, and a tooth having a shank secured in such socket, so as to allow it to rotate freely therein, the said tooth having downward-projecting forked blades with their cutting-edges inclined backward from the axis of the shank of the tooth, and in details of the construction of the parts and their combination, as more particularly hereinafter described, and pointed out in the claims.

Figure 1:
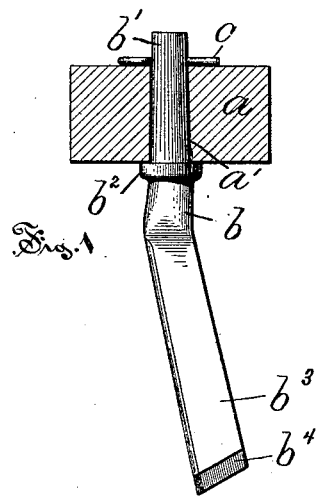
Figure 2:
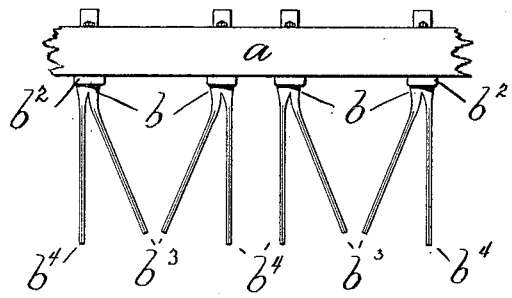

Referring to the accompanying drawings, Figure 1 is a view in cross-section of the frame of a harrow through a tooth-socket, showing the tooth in side view. Fig. 2 is a detail front view of several of my improved teeth.

In the drawings, the letter $a$ denotes the frame of a harrow, cultivator, or like farm implement, and $a'$ a socket made in the frame for the reception of the shank of the tooth $b$.

The frame of the implement may be made of any convenient material, and the sockets preferably extend completely through the frame at substantially right angles to the plane of the frame. The tooth $b$ has a shank, $b'$, that is preferably tapered from the shoulder $b^2$ to the upper end, through which an opening is made for the reception of the spring-pin $c$. This shank is adapted to fit within a socket, $a'$, and is held therein by the spring-pin that prevents movement in one direction, the shoulder preventing it in the other. Any other ordinary means may of course be used for fastening the tooth in the frame, the object being to pivot the tooth in the harrow-frame so that it will turn on its axis without longitudinal play. Below the shoulder the tooth branches or forks to form the blades $b^3$ $b^4$, the front or cutting edges of which incline backward from the axis of the shank. While one of the blades is in a plane passing from front to rear through the axis of the tooth, or diverges but a little from it, the other blade forms a considerable angle with such plane. These blades are flat and present their cutting-edges in the direction in which the implement is moved in cutting and breaking up the ground.

The teeth may be provided with two or more cutting-blades, but I prefer to use the number shown and arranged, as herein described. These teeth may be secured in a harrow in any desirable number, and in such position with reference to each other that the teeth are arranged in sets, one tooth having one or more of its blades turned toward the right side, as well as backward, and the other having blades turned to the left and backward. Such an arrangement of the teeth in a harrow or cultivator will cause them, when viewed from the front of the implement, to closely resemble a series of capital M's.

The peculiar form of the blades in thickness, closeness in arrangement of the parts, and their strength and lightness due to the peculiar construction, adapt the tooth for either heavy work in a large field, or on a harrow or cultivator to be used in a garden, nursery, or grove.

I am aware that a harrow-tooth has been constructed with a plurality of blades, but the said blades extend at right angles to the harrow-frame or parallel to each other and the pivoting-shank.

By constructing the tooth as herein described with a plural number of blades at angles to the pivoting shank, and at angles to each other, less work is required to draw the implement over the ground, while its operation is just as effective.

I claim as my improvement—

1. The herein-described harrow-tooth, consisting, essentially, of a pivoting shank, $b'$, and a plurality of blades formed therewith, having their cutting-edges extending at an angle or angles therefrom and at angles to each other, substantially as described.

2. In combination with the frame of a harrow or similar farm implement, the herein-described harrow-teeth, each consisting, essentially, of a pivoting shank, $b'$, and a plurality of blades formed therewith and having their cutting-edges extending at an angle or angles therefrom and at angles to each other, substantially as described.

THOMAS E. DAVIES.

Witnesses:
CHAS. L. BURDETT,
H. R. WILLIAMS.